UNITED STATES PATENT OFFICE.

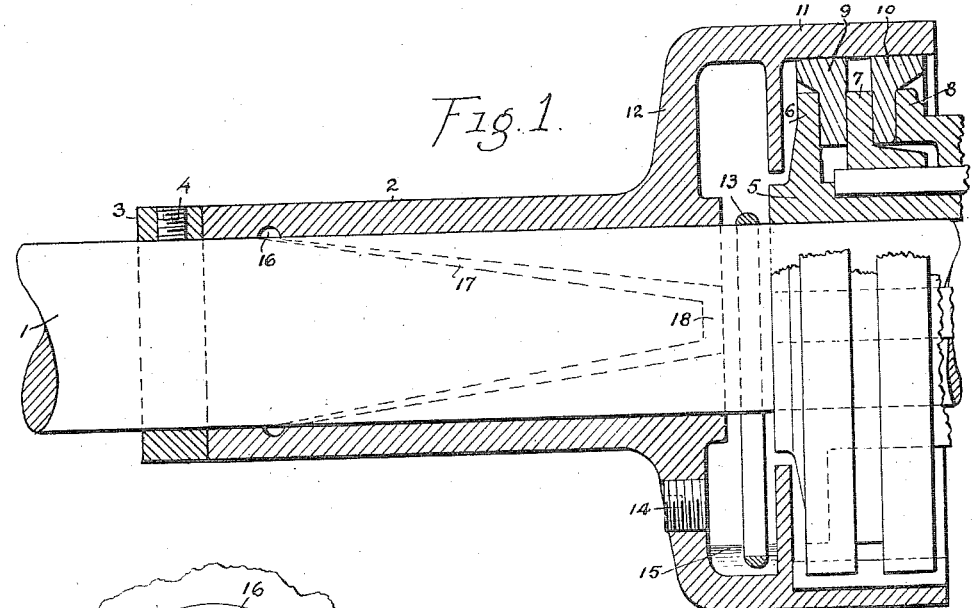
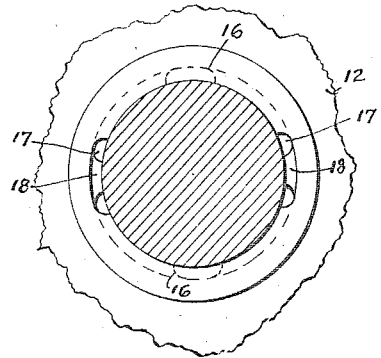
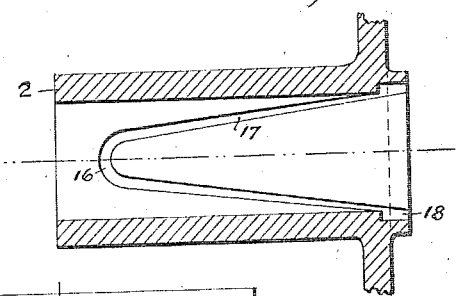
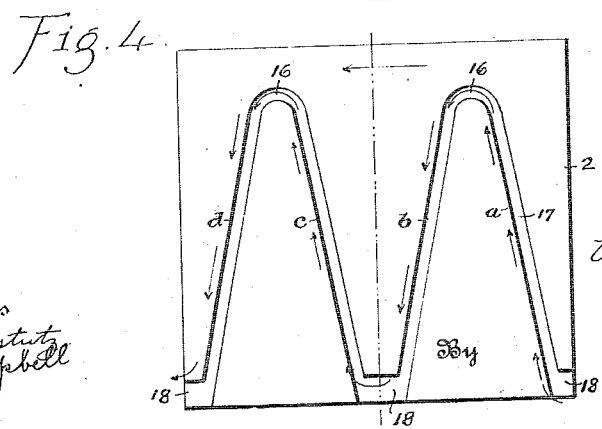

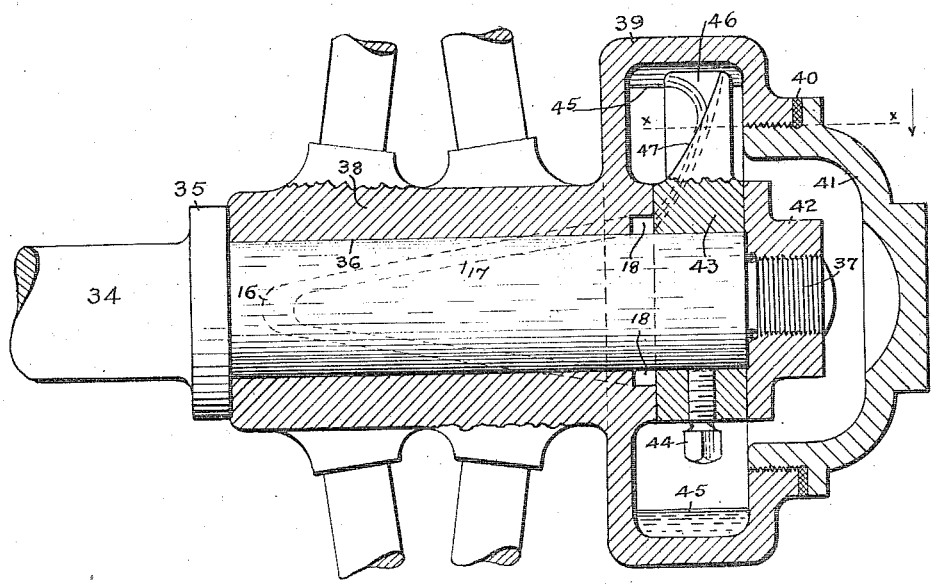
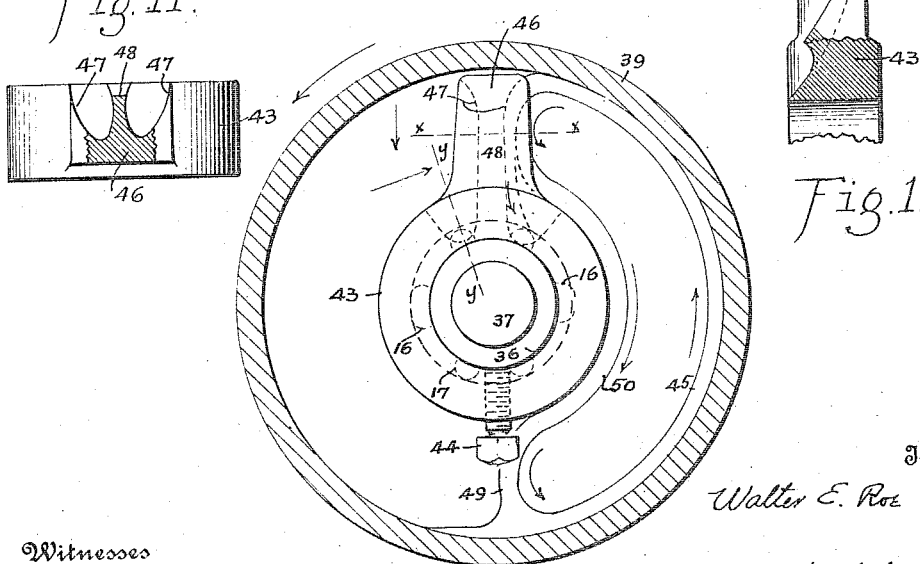

WALTER E. ROE, OF MISHAWAKA, INDIANA, ASSIGNOR TO DODGE MANUFACTURING COMPANY, OF MISHAWAKA, INDIANA, A CORPORATION OF INDIANA.

AUTOMATIC LUBRICATOR.

1,279,004.   Specification of Letters Patent.   Patented Sept. 17, 1918.

Application filed January 18, 1915. Serial No. 2,891.

*To all whom it may concern:*

Be it known that I, WALTER E. ROE, citizen of the United States, residing at Mishawaka, in the county of St. Joseph and State of Indiana, have invented certain new and useful Improvements in Automatic Lubricators, of which the following is a specification.

My invention relates to improvements in automatic lubrication and it more especially consists of the features pointed out in the annexed claims.

The purpose of my invention is to provide automatic lubricating means that shall operate continuously instead of in an intermittent manner as is usual in self lubricating devices; to make the same applicable in general to clutches, loose pulleys, etc.; to make the same adapted to disconnective shaft couplings; to make the self-oiling features applicable to various specific types of clutches, in which the clutching member is on the driven shaft or vice-versa, or those forms in which both members are free and the shaft is stationary; to uses in which an axle stands still but the wheel mounted thereon rotates; it is applicable by the use of either rings or paddles to automatic lubrication of any parts whether used for one purpose or another without the aid of extraneous devices of any kind whatever. In short, it is self-circulatory, self-contained, of the simplest construction and automatically continuous in action.

With these and other ends in view I illustrate in the accompanying drawings such instances of adaptation as will disclose the broad features without limiting myself to the specific details shown.

Figure 1— is an elevation in section of a clutch adaptation.

Fig. 2— is a transverse elevation of the entry end to the oil channels.

Fig. 3— is a longitudinal elevation in section of oil grooves with the shaft removed.

Fig. 4— is a developed diagrammatic plan of the inner surface of Fig. 3.

Figure 5:
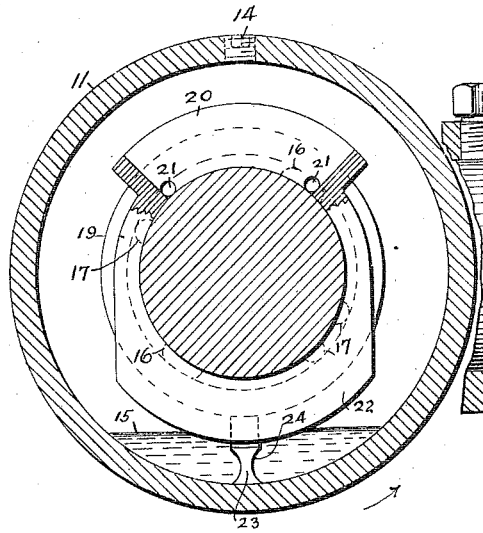

Fig. 5— is an end elevation of a modification showing an oil feeding collar.

Figure 6:
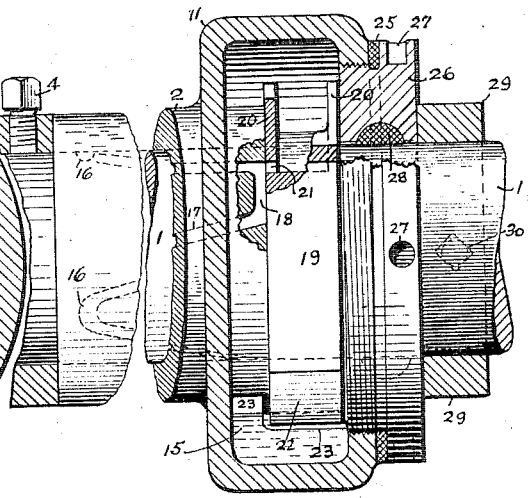

Fig. 6— is a longitudinal elevation in section of Fig. 5 in an assembled relation.

Figure 7:
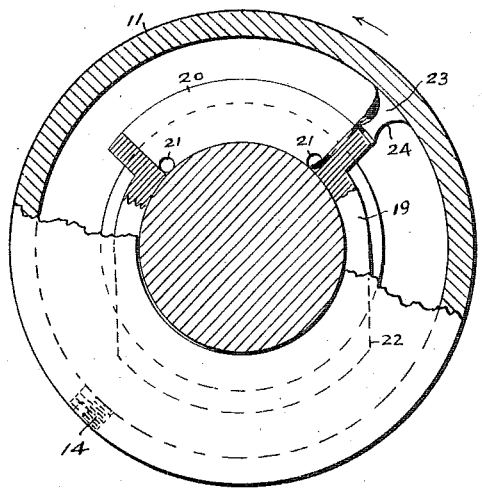

Fig. 7— illustrates a suppositious oil travel produced by the form instanced in Fig. 5.

Figure 8:
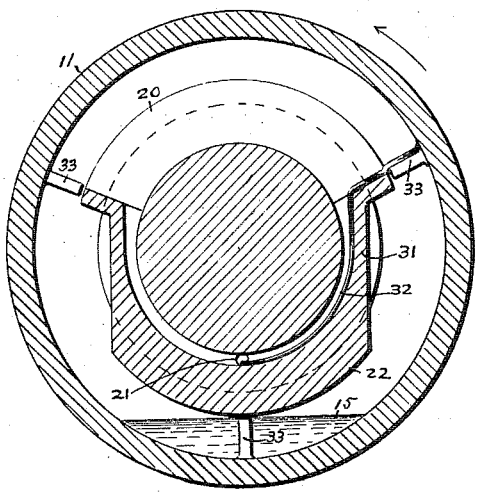

Fig. 8— showns another form of oil feeding collar.

Fig. 9— shows the system applied to a stationary axle.

Fig. 10— is an end elevation of Fig. 9 with the inclosing casing in section.

Fig. 11— is a cross section on line $x\ x$ of Fig. 10, and

Fig. 12— is a section on line $y\ y$ of the same figure.

In the ordinary type of self-oiling devices the flow of lubricant is intermittent. This defect militates much against their efficiency, in fact in many cases serious losses have been incurred through dependence on such systems because of clogging, etc., causing the entire stoppage of lubricant. With a continuously circulating system such risks are not encountered.

In the case of a clutch in which the "keyed-on" member and shaft rotate within the intermittently moving part the shaft 1 passes through hub 2 of the driven member. It is held in place by collar 3 and set screw 4. The interior hub 5 of the driving member has a flange 6 against which ring 9 abuts, against this disk 7 rests. Between disk 7 and sleeve 8 another ring 10 is placed. Bell 11 incloses these parts and it is joined to hub 2 by crown 12. Any other form of clutch parts would be as adaptable as those shown.

A well known form of lifting device such as oil ring 13 may be threaded on shaft 1 so that its lowest portion rolls through oil 15 contained within the "bell" 11. Plug 14 closes an oil admission opening which may be located at any convenient place.

In order that the oil from 15 may be carried to the bearing surface of hub 2 recesses 18 are formed on the inner face of 12 adjacent shaft 1. These recesses are placed, in this instance, diametrically opposite each other and they pick up the oil from shaft 1 then convey it, as shown by the arrows of Fig. 4, into the angular groove 17 which comprises two outgoing and two returning portions. When the direction of rotation is as indicated in this figure the oil stream follows wall *a* being carried lengthwise thereof on account of the inclination of groove 17. At 16 a short curve is formed which sends the stream against wall *b* leading it toward the second recess 18. At this point it may combine with a second intake and follow wall *e* until reversed by another curve 16 to follow wall *d* back to its starting point in the first recess 18, to again repeat its journey being constantly depleted more or less according to the demands of the bearing surfaces and as constantly replenished through recesses 18 gathering a new supply. In this very simple manner the oil is kept in continuous circulation, insuring the highest lubricating efficiency.

So long as part 2 is stationary oil will gather at 15 by gravity and ring 13 will raise it onto the shaft, but as soon as part 2 is clutched to the shaft and is revolved rapidly much of the oil may spread itself out into a concentric layer inside of bell 11 and as all the parts will be moving together, recesses 18 no longer stationary will not gather lubricant, hence another adaptation must be made use of.

An oil "collar" 19 may be hung loosely on the shaft 1 as instanced in Figs. 5, 6 and 7. This has a counterweight 22 which serves to hold it upright as the shaft rotates. Its upper portion is "copper" shaped at 20 and from this collecting chamber oil is delivered through exits 21. Two openings are provided so as to accommodate the "collar" to any direction of rotation the adjacent parts may take.

Without some means to break up the oil film on the inside of 11 no oil would be delivered to the hopper 20. This is however accomplished by means of one or more paddles or vanes 23 mounted on member 11 having curved sides 24 adapted to hold a quantity of oil which in the course of its rotation is delivered to 20 somewhat as shown hypothetically in Fig. 7. Such a paddle in practical service will pick up enough oil to amply lubricate the parts.

Should more than one paddle be used as instanced in Fig. 8 the radial type 33 may be used and a modified "collar" 31 employed having an oil groove 32 leading to the bottom of the shaft where exit is found through an opening 21 to recesses 18. A collar 29 and set screw 30 serves to hold parts 2, etc., between it and collar 3. Bell 11 has follower nut 26 threaded therein and packings 25 and 28 serve to retain oil within 11. Nut 26 is easily tightened against the packing by a spanner wrench engaging holes 27.

The structure disclosed in Figs. 5 to 12 inclusive is not specifically claimed herein but is subject to separate prosecution.

When lubricating a stationary axle another expedient may be used, such for instance as is shown in Figs. 9, 10, 11 and 12. In such an adaptation axle 34 has collar 35 beyond which bearing portion 36 is found. This may terminate in a threaded end 37. Hub 38 of a vehicle or other wheel rotates on 36. It may have an enlargement 39 into which cap 41 is screwed against packing ring 40. Oil "collars" 19 or 31 are replaced by 43 which is held on 36 by set screw 44. The course that may be taken by the oil is shown diagrammatically in Fig. 10 wherein an outer layer is shown at 45 and an inner an outer layer at 50 with a connecting drip surplus layer 49. This course is taken because 43 has a finger 46 projecting radially therefrom which has a narrow center portion 48 with curved grooves 47 on each side. These grooves lead the oil inward to recesses 18, continually supplying the demand without becoming intermittent in action. Nut 42 holds the parts in assembled relation.

In its broadest sense the use of any suitable means for delivering lubricant to the recesses at the leading-in end of the angular grooves is included in this invention as well as a specific way in which this is accomplished through the use of a ring oiler.

From the preceding description it will be seen how simply a continuous feed, self-circulatory lubricating system can be produced. It is not alone simple in design, economical in manufacture but also extremely easy to install, requiring the minimum of attention to guarantee the highest efficiency in use under all conditions.

What I claim is,

1. A shaft, a free member carried by the shaft having a series of recurving angularly disposed grooves formed in its bearing face, an oiling chamber between the shaft and the free member and located within such member, and a ring oiler operable therein adapted to supply oil to the grooves, pairs of said grooves connecting with oil gathering recesses formed where the grooves open into the oil containing chamber.

2. A shaft, a free member carried thereby said member having a hub forming a bearing on the shaft, recesses formed on the inner end of the hub, connecting ducts that lead therefrom at diverging angles, a pair of converging ducts having a recurving of their point of intersection near junction at their point of intersection near the other end of the hub whereby the oil is gathered by the recesses and caused to circulate through the ducts continuously to lubricate the shaft and the free member.

3. A shaft, a loose member thereon, both having separate lengthwise bearing surfaces being movable with respect to each other as desired so as to collect lubricant through a rotative movement, and means adapted to cause the lubricant to enter the bearing surfaces through recesses formed at one end and circulate therethrough in both directions axially and also circumferentially.

4. A rotatable shaft, a loose member thereon, having a bearing surface therein, an oil lifter loose on said shaft but movable therewith, the loose member having a plurality of grooves within the bearing surface said grooves being placed at an angle to each other and interconnected at one end in pairs to oil gathering recesses formed at the other end adapted to supply oil to a pair of grooves leading at diverging angles therefrom.

5. A bearing member having a plurality of continuously connected grooves formed therein at diverging angles to each other, pairs of such grooves being interconnected by oil gathering recesses formed in such member.

6. A bearing member having end faces external of its bearing surfaces one of said faces having recesses formed therein so as to connect with diverging grooves leading therefrom, pairs of such grooves being joined to each other without extending into the other face.

7. A bearing member having pairs of diverging grooves connected to each other at their points of intersection and terminating in separate recesses.

8. A self lubricating bearing member having pairs of diverging grooves joined at one end to each other so that one groove of each adjacent pair connects with a recess common to both at their other end.

9. A bearing member having a plurality of pairs of angularly disposed grooves alternate converging pairs being jointed to each other at one end and adjacent pairs of diverging grooves connecting with a recess common to both at the other end.

10. A bearing member having a pair of curved grooves formed in its bearing surface joined at one end to each other by means of an enlarged recess, and means for directing lubricant toward such recesses.

11. A bearing member having a pair of recurving grooves formed in its bearing surface terminating in pairs adjacent each other, recesses formed at such points adapted to gather lubricant for the grooves, a lubricant reservoir formed in the bearing member, and means for directing the contents toward the said recesses.

12. An automatic lubricating device, comprising a bearing member, a shaft therein, an oil reservoir in the bearing member, recurving grooves in the bearing surface communicating with the reservoir, enlarged open sided recesses formed at the intersection of pairs of grooves, and means coöperating between the reservoir and the recesses adapted to direct lubricant from the latter toward the former.

In testimony whereof I affix my signature in presence of two witnesses.

WALTER E. ROE.

Witnesses:
S. W. SCHUYLER,
C. W. GILL.